Aug. 17, 1965
F. S. KERR
3,201,648
ELECTRIC GOVERNOR
Filed Dec. 21, 1959
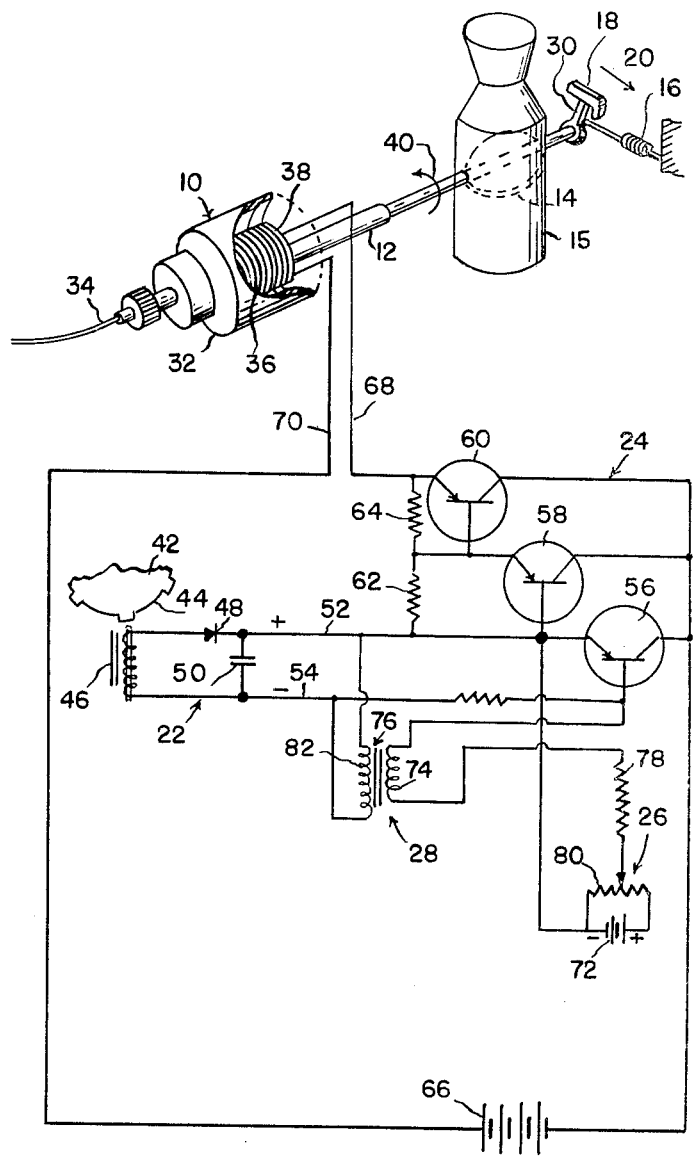
INVENTOR.
FRED S. KERR
BY Whittemore,
Hulbert & Belknap
ATTORNEYS

United States Patent Office 3,201,648
Patented Aug. 17, 1965

3,201,648
ELECTRIC GOVERNOR
Fred S. Kerr, Royal Oak, Mich., assignor to Holley Carburetor Company, Van Dyke, Mich., a corporation of Michigan
Filed Dec. 21, 1959, Ser. No. 860,790
6 Claims. (Cl. 317—5)

The present invention relates to electronic governors and refers more specifically to an electronic engine speed governor including means sensitive to rate of change of engine speed for anticipating engine speed change and controlling governing action in accordance therewith.

In the past governors have been operable to control engine speed only after a predetermined speed has been reached. No governors are known wherein means have been included therein responsive to the rate at which an engine approaches the predetermined speed for compensating the time of initiating governing action in accordance with said rate. Similarly no compensation has been provided for the rate of change of engine speed during application of the governing signal. Consequently with previous governors, engines have been prone to overspeed due to the rotating inertia of the engine. Such overspeeding causes the governor to become fully actuated and results in a severe engine speed cut-back which is detrimental to smooth governing action.

Therefore it is one of the objects of the present invention to provide an improved electronic governor including means for anticipating the rate of change of engine speed.

Another object is to provide an improved electronic governor including means for sensing and compensating for the rate of change of engine speed as the engine approaches the speed at which governing action is desired.

Another object of the present invention is to provide an improved electronic governor including means for varying the governing signal in proportion to the rate of change of engine speed.

More specifically it is an object to provide an electronic engine speed governor comprising means for developing an electrical signal proportional to engine speed, means providing an electrical signal in opposition to the signal developed in proportion to engine speed to prevent governing action until a predetermined engine speed is approached, and means for varying the opposing electrical signal in accordance with the rate of change of engine speed.

Still more specifically it is an object to provide an electronic engine speed governor comprising means for developing an electrical signal proportional to engine speed, means for amplifying said electrical signal and feeding it to a magnetic clutch, said magnetic clutch being operably associated with the engine throttle valve to close said throttle valve an amount proportional to the magnitude of the electrical signal developed, means for opposing the voltage developed in proportion to engine speed by a second voltage to prevent governing action until a predetermined governed engine speed is approached, and means for varying said second voltage as said governed engine speed is approached in accordance with the rate of change of engine speed.

Another object is to provide an electronic engine speed governor comprising means for developing a direct electrical signal proportional to engine speed, means for applying said signal to amplifier means for amplification and subsequent use in governing the engine speed, and means for applying an adjustable constant direct electric signal to the amplifier means in opposition to the developed signal to prevent amplification of the developed signal until it has obtained a predetermined value and transformer means operable to vary the adjustable constant direct electric voltage in accordance with rate of change of the developed direct electric signal.

Another object is to provide an improved electronic governor which is simple in construction, economical to manufacture and efficient in use.

Other objects and features of the invention will become apparent as the description proceeds, especially when taken in conjunction with the accompanying drawing, illustrating a preferred embodiment of the invention, wherein:

The figure is a partly diagrammatic and partly schematic illustration of an electronic governor constructed according to the present invention.

With reference to the figure a specific embodiment of the invention will now be disclosed.

The electronic governor shown in the figure comprises a magnetic clutch generally indicated 10 connected by means of shaft 12 to an engine throttle valve 14, which clutch is operable on being energized to tend to close throttle valve 14 in opposition to resilient means 16 tending to open the throttle valve on movement of stop 18 in the direction of arrow 20.

Clutch 10 is activated by means of a signal proportional to engine speed developed in the signal developing portion generally indicated 22 of the governor circuit after the signal has been amplified in the amplifier portion 24 of the governor circuit. Bias means generally indicated 26 is provided to prevent application of the signal developed in the signal developing portion 22 of the governor circuit to the amplifier portion 24 thereof until a predetermined engine speed is approached.

In addition, according to the invention, engine speed anticipating means 28 are provided in the governor circuit to sense the rate of change of engine speed and to compensate therefore by regulating the bias from means 26 to provide smooth engine governing without overspeeding of the engine and resulting severe engine cutbacks present in many governors.

More specifically the electronic engine speed governor disclosed in the figure is operable to control the speed of an engine (not shown) through regulation of throttle valve 14 positioned in Venturi 15. As shown the throttle 14 is mounted for rotation on shaft 12 which has rigidly attached thereto for rotation therewith finger 30 which is biased by resilient means 16 so as to open throttle valve 14 on movement in the direction of arrow 20 of stop 18 which may be a linkage in the well known accelerator system.

Clutch 10 which is connected to the end of shaft 12 opposite finger 30 is of the magnetic type common in the clutch art wherein one side slips relative to the other in normal operation. Thus with side 32 of clutch 10 connected to means such as the crank shaft of the engine for rotation therewith through flexible cable 34 a torque will be developed on shaft 12 when coil 38 on side 36 of the clutch 10 is energized. The magnitude of the torque developed on shaft 12 will be proportional to the electrical signal passing through coil 38 and may be in either angular direction depending upon the direction of rotation of side 32 and the direction of winding of coil 38 in conjunction with the polarity of the signal applied thereto as will be understood by those in the art.

The type of clutch 10 illustrated and the specific construction thereof as shown is not intended to be limiting in the present invention but is illustrative only of many clutches suitable for use with the present invention. In the operation of the present invention it is only necessary that clutch 10 be such that on passing of an electrical signal from amplifier means 24 through coil 38 a torque proportional to the electrical signal will be developed on shaft 12 which will tend to rotate shaft 12 in the direction of arrow 40.

As shown an alternating signal proportional to the speed of the engine is developed by means of a rotating disc 42 which has peripheral recesses 44 around the edge thereof in conjunction with a magnetic pick-up probe 46 positioned adjacent thereto. Thus on rotating disc 42 in accordance with engine speed through appropriate gearing from a rotating part of the engine such as the distributor shaft, the magnetic pick-up probe is alternately attracted more or less strongly toward disc 42 to develop an alternating electrical signal, the magnitude of which is proportional to engine speed. As shown the alternating electrical signal is rectified by means of a rectifier 48 in conjunction with capacitor 50 into a direct electrical signal, the magnitude of which is proportional to engine speed.

The direct electrical signal thus developed having the polarity indicated is then fed over conductors 52 and 54 to transistor 56 in amplifier means 24 where the signal is caused to be amplified through the three stage transistorized amplifier means including transistors 56, 58 and 60 in conjunction with resistors 62 and 64 and battery 66 which may be a vehicle battery, all in the well known manner of transistorized amplifier circuits. The amplified electrical signal from amplifier means 24 as previously indicated is used to energize clutch 10 through conductors 68 and 70.

A bias voltage is also applied to the transistor 56 by means of bias battery 72 connected as shown in the input circuit of transistor 56. The bias developed by means of battery 72 and applied to transistor 56 through the secondary winding 74 of the transformer generally indicated 76, resistor 78, and the variable resistance 80 will be in opposition to the signal developed by the magnetic probe 46 in the circuit as shown and is of a polarity as shown to prevent conduction through transistor 56. Therefore the signal developed proportioned to engine speed by signal developing means 22 will not be effective to cause the amplifier means 24 to energize coil 38 until the engine speed has reached a point where the signal developed is larger than the constant bias due to battery 72.

It will be understood that since resistor 80 is adjustable that the engine speed at which the signal developed according to engine speed becomes larger than the bias voltage may be varied to produce governing action at different engine speeds.

Further in accordance with the present invention there is provided the means 28 for anticipating the rate of change of engine speed as it approaches the governing speed and during governing action. The anticipating means 28 comprises the transformer generally indicated 76 having the primary winding 82 as shown connected between conductors 52 and 54 and having a secondary winding 74 in the bias circuit as previously indicated.

Thus as the direct current signal developed by the magnetic probe 46 is increased or decreased a direct current electrical signal varying in magnitude will be present in the primary winding 82 of transformer 76 which will cause an electrical signal to appear on the secondary winding 74 of the transformer having a magnitude depending on the rate of change of magnitude of the direct current signal produced by probe 46 which signal in the construction shown is in series with the bias voltage from battery 72 to determine the total bias on the transistor 56 and thus the engine speed at which governing is initiated.

In overall operation of the electronic engine speed governor disclosed the stop 18 is moved in the direction of arrow 20 permitting the finger 30 to be rotated in a clockwise direction by resilient means 16 whereby shaft 12 is rotated to cause throttle valve 14 to open increasing the speed of the engine on which Venturi 15 is mounted.

Magnetic pick-up probe 46 associated with disc 42 which is rotating in accordance with engine speed develops an alternating electrical signal proportional to the engine speed which is rectified by rectifier 48 in conjunction with capacitor 50. Thus a direct signal, the magnitude of which is proportional to instantaneous engine speed and which varies at a rate depending upon the rate of change of engine speed, is present across conductors 52 and 54 and induces a voltage through transformer 76 on the secondary winding 74 thereof which is proportional to the rate of change of engine speed.

Therefore the engine speed at which governing action is initiated is varied in accordance with the rate at which the engine speed approaches the desired engine speed. Similarly after governing action has started the electrical signal delivered to amplifier means 24 is controlled in accordance with the rate of change of engine speed being less when the rate of change of engine speed is lower.

Thus as the speed of the engine being governed approaches the predetermined speed below which it is desired to maintain the engine speed the rate at which the engine speed approaches the desired maximum engine speed is sensed by the transformer 76 which transformer produces a voltage in the secondary winding 74 thereof proportional to the rate at which the engine speed approaches the predetermined engine speed. This voltage when combined with the voltage from battery 72 in accordance with the setting of the variable resistor 80 will bias the transistor 56 to permit conduction thereof at different predetermined speeds. Initiation of the governing action will be at an engine speed above or below the engine speed at which the transistor 56 would be permitted to conduct if the speed of the engine approached the predetermined speed thereof at a desired rate in accordance with whether the rate at which the speed of the engine approaches the predetermined speed is above or below a predetermined rate of change of engine speed.

Also, after the engine has reached the governed speed should the speed of the engine suddenly increase the rate of change of engine speed would be immediately sensed by the transformer 76 which would produce a signal across the secondary coil 74 thereof of a polarity to reduce the bias on the transistor 56 to increase the governing signal applied to the clutch 10. Likewise if during operation of the engine at governed speed the speed is suddenly reduced the rate of change of engine speed is immediately sensed by the transformer 76 which will cause a voltage across the secondary winding 74 of a polarity to increase the bias on the transistor 56 and reduce the governing signal fed to the clutch 10.

During normal operation when the rate of engine speed is neither increasing nor decreasing the transformer 28 has no effect on the bias of the transistor 56 and the governing signal applied to the clutch 10 is controlled entirely by the bias from battery 72. Thus transformer 76 decreases the bias applied to transistor 56 at any time the rate of change of engine speed is increasing and increases the bias applied to transistor 56 at any time the rate of change of engine speed is decreasing.

The signal applied to amplifier means 24 is amplified and applied to coil 38 of clutch 10. Side 32 of clutch 10 is rotated by convenient means through flexible cable 34 as previously indicated. Thus the shaft 12 is caused to rotate on application of the signal from amplifier means 24 to coil 38 to tend to close the throttle valve 14 in opposition to resilient means 16. As will be understood when a balance is reached between the forces applied to shaft 12 by resilient means 16 and clutch 10 the engine will have reached the predetermined governed speed.

Thus it will be apparent that in accordance with the invention there is provided means for anticipating engine speed through sensing the rate of change of engine speed to provide an electronic governor which prevents engine over-speeding due to rotating inertia of the engine and the resultant severe engine speed cut-backs occasioned thereby.

The drawing and the foregoing specification constitute a description of the improved electronic governor in such full, clear, concise and exact terms as to enable any person skilled in the art to practice the invention, the scope of which is indicated by the appended claims.

What I claim as my invention:

1. An engine speed governor comprising mechanical control means for regulating the speed of an engine to be governed in accordance with the magnitude of an electrical signal applied to the control means, signal developing means for producing an electrical governing signal the magnitude of which is proportional to the speed of the engine to be governed and for applying said developed signal to said control means, bias means connected to said signal developing means for applying bias to the signal developing means to prevent application of the developed signal to the control means before the developed signal has reached a predetermined magnitude and separate means responsive only to the rate of change of the developed signal connected between the signal developing means and the bias means for varying the bias applied to the signal developing means by the bias means to change the predetermined signal magnitude in accordance with the rate of change of the developed signal as it approaches the predetermined signal magnitude.

2. An engine speed governor comprising mechanical control means for regulating the speed of the engine to be governed in accordance with the magnitude of an electrical signal applied to the control means, signal developing means for producing an electrical governing signal the magnitude of which is proportional to the speed of the engine to be governed and for applying said developed signal to said control means, bias means connected to said signal developing means for applying bias to the signal developing means to prevent application of the developed signal to the control means before the developed signal has reached a predetermined magnitude and separate means responsive only to the rate of change of the developed signal connected between the signal developing means and the bias means for varying the bias applied to the signal developing means by the bias means in accordance with the rate of change of the developed signal at signal magnitudes above the predetermined signal magnitude.

3. An engine speed governor comprising mechanical control means for regulating the speed of the engine to be governed in accordance with the magnitude of an electrical signal applied to the control means, signal developing means for producing an electrical governing signal the magnitude of which is proportional to the speed of the engine to be governed and for applying said developed signal to said control means, bias means connected to said signal developing and applying means for preventing application of the developed signal to the control means before the developed signal has reached a predetermined magnitude and separate means responsive only to the rate of change of the developed signal connected between the signal developing and applying means and the bias means for varying the bias applied to the signal developing and applying means by the bias means to change the predetermined signal magnitude in accordance with the rate of change of the developed signal as it approaches the predetermined signal and for varying the bias applied to the signal developing means by the bias means in accordance with the rate of change of the developed signal at signal magnitudes above the predetermined signal magnitude.

4. An engine speed governor as set forth in claim 3 wherein the separate means for varying the bias applied to the signal developing means comprises a transformer having a primary winding connected in parallel with the signal developing means and a secondary winding connected in series opposition with the bias means.

5. An engine speed governor comprising mechanical control means for regulating the speed of an engine to be governed in accordance with the magnitude of an electrical signal applied to the control means, signal developing means for producing an electrical governing signal the magnitude of which is proportional to the speed of the engine to be governed, amplifier means having input terminals connected across the signal developing means for amplifying said developed signal and applying it to said control means, bias means connected across the input terminals of said amplifying means for applying bias to the amplifying means to prevent application of the developed signal to the amplifying means before the developed signal has reached a predetermined magnitude and a transformer responsive only to the rate of change of the developed signal having a primary winding connected across the signal developing means and a secondary winding in series with the bias means for varying the bias applied to the amplifying means to change the predetermined signal magnitude in accordance with the rate of change of the developed signal as it approaches the predetermined signal magnitude and for varying the bias applied to the amplifying means by the bias means in accordance with the rate of change of the developed signal at signal magnitudes above the predetermined signal magnitude.

6. An engine speed governor as set forth in claim 5 wherein the bias means includes a resistor and source of bias voltage connected in a parallel circuit, means connecting one end of the parallel circuit to one input terminal of the amplifier means, a variable position contact on the resistor in the parallel circuit and means connecting the variable position contact to the other input terminal of the amplifier means through said transformer secondary winding.

References Cited by the Examiner

UNITED STATES PATENTS

| | | | |
|---|---|---|---|
| 2,473,838 | 6/49 | Aldrich | 318—307 |
| 2,668,921 | 2/54 | Lash | 317—5 |
| 2,910,624 | 10/59 | Martin | 317—5 |
| 2,941,120 | 6/60 | Harman et al. | 317—5 |
| 3,036,562 | 5/62 | Scott | 317—5 |

SAMUEL BERNSTEIN, *Primary Examiner.*

WALTER L. CARLSON, *Examiner.*